M. KOPPELMAN.

COAT COLLAR.

APPLICATION FILED OCT. 12, 1909.

Reissued Apr. 19, 1910.

13,104.

2 SHEETS—SHEET 1.

Witnesses

S. G. O'Rourke

E. A. Schenck

Inventor

M. Koppelman.

By S. J. Cox.

Attorney

M. KOPPELMAN.

COAT COLLAR.

APPLICATION FILED OCT. 12, 1909.

Reissued Apr. 19, 1910.

13,104.

2 SHEETS—SHEET 2.

Inventor

M. Koppelman.

Witnesses

S. S. O'Rourke

E. Kochen Jr.

By S. J. Cox.

Attorney

UNITED STATES PATENT OFFICE.

MORRIS KOPPELMAN, OF NEW YORK, N. Y.

COAT-COLLAR.

13,104. Specification of Reissued Letters Patent. Reissued Apr. 19, 1910.

Original No. 922,434, dated May 18, 1909, Serial No. 473,954. Application for reissue filed October 12, 1909. Serial No. 522,358.

*To all whom it may concern:*

Be it known that I, MORRIS KOPPELMAN, a citizen of the United States, and a resident of the borough of Brooklyn, in the county of Kings, city and State of New York, have invented certain new and useful Improvements in Coat-Collars, of which the following is a specification.

The improvements relate to wearing apparel and particularly to the collars of raincoats, overcoats and similar garments, and may be applied to garments of this character adapted to be worn by men and women. In applying these improvements to said garments various materials may be used, and the material on one side of the collar may be different from the material on the other side if desired. They are also adapted to be applied to double or single breasted coats and coats having fly fronts or arranged to button through.

The objects of the invention, among others, are to provide a garment of the character indicated with a double collar of simple, strong and durable construction which may be quickly and easily converted from one style into another, as, for instance, from the ordinary turned down collar with lapels to a military collar, without detracting from the shape and style, and without in any way affecting the other parts of the garment. By the use of the improvements the coat may be provided with a double collar which may be converted by the wearer from one style into another in a few seconds; and when so converted it will have the appearance of being the only collar with which the coat is provided, the other collar being entirely concealed from view and in nowise affecting the appearance of the one in use.

The improvements consist in the construction, combination and arrangement of parts hereinafter described and claimed and illustrated in the accompanying drawings.

Figure 1:
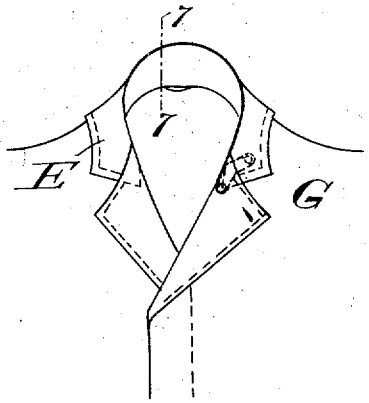
Figure 2:
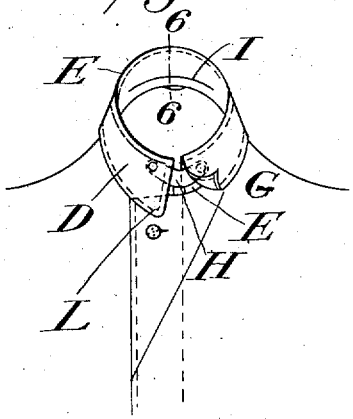
Figure 3:
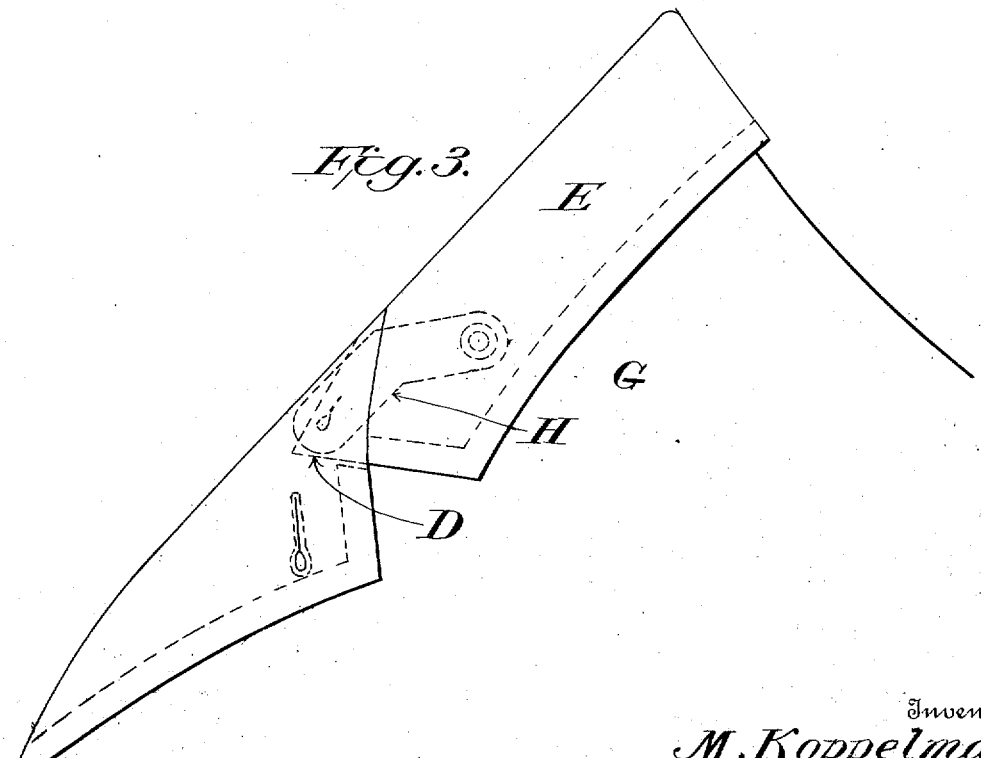
Figure 4:
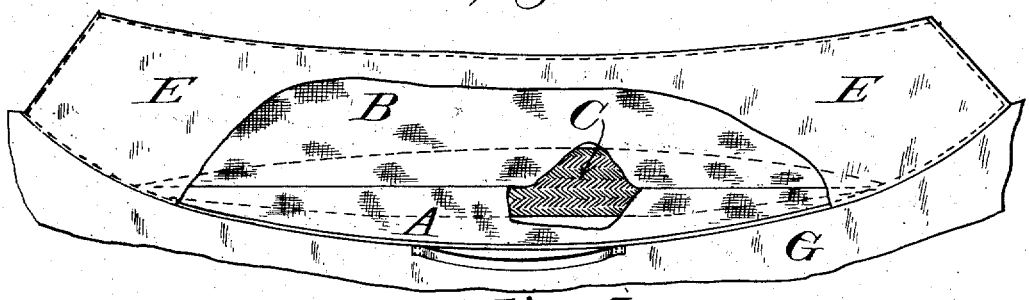
Figure 5:
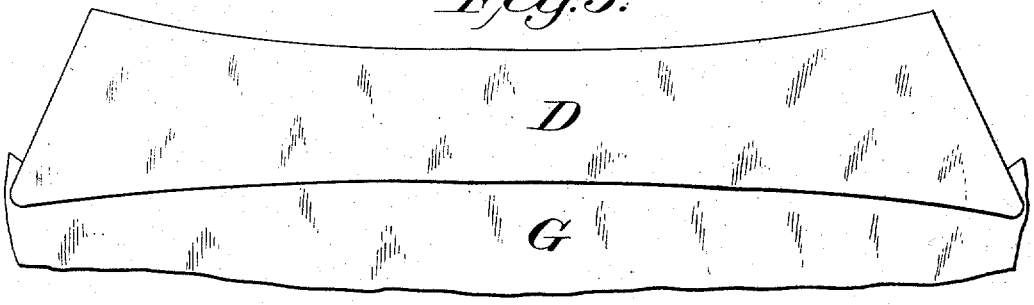
Figure 6:
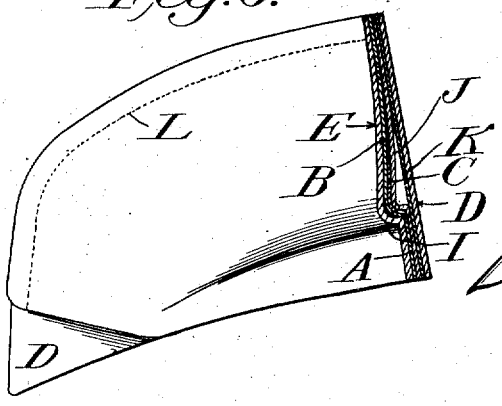
Figure 7:
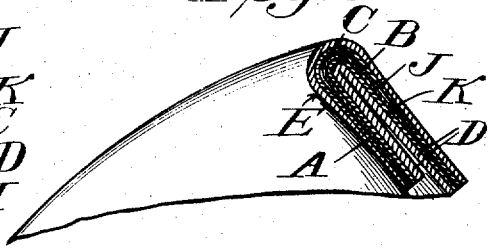

In the said drawings Figure 1 is a front view of the neck of a coat with a collar embodying the improvements applied thereto, showing the same adjusted to form the ordinary turned down collar. Fig. 2 is a view of the same parts showing the collar adjusted to form a military collar. Fig. 3 is a side view of the parts adjusted as shown in Fig. 1. Fig. 4 is an inside view of the neck of the coat with the collar turned up and portions of the cloth cut away to expose inner parts. Fig. 5 is a back outside view of the same. Fig. 6 is a vertical section on line 6—6 of Fig. 2. Fig. 7 is a section on the line 7—7 of Fig. 1 showing a detached portion of the upper part of the collar when turned down.

The part E forms the upper and outer side of the ordinary turned-down collar and the inner side of the "military" collar, and is joined to the lapel of the coat G in the usual manner. To the reverse side of E is secured the part D which forms the outer side of the turned-up or "military" collar and the inner and under side of the turned-down collar. It is preferably stitched or otherwise connected to the part E at its upper or outer edge only, the inner lower edge being secured to the neck of the coat proper, and its two ends terminate in points which are not secured either to the coat or the part E, as best shown in Fig. 2. The stitching L at the end of the part E does not extend through to the part D. Between these points or flaps and the part E are buttons or similar fastening means secured to the latter, with a link H, provided with button-holes in its ends, forms a connection between the two sides of the collars and is attached thereto by means of these fastenings. This link is so formed that it may be turned aside after being detached from the fastening at the right-hand end and folded under the collar and lapel, as shown in Fig. 3. It will be understood that this link is used only when the parts are adjusted to form the turned up or "military" collar. The part E is wider than the part D at the center or back, and narrower at the front, or ends, and it is therefore necessary to provide for the extra width of the one when the other is in position. The front portion of the part D is concealed beneath the lapel of the coat when the ordinary collar is in use, as indicated by dotted lines in Fig. 3, and the excess of width of the part E is taken up by the crease formed at I when the collar is turned up. In this manner the two outer parts of the collar automatically adjust themselves to the desired shape when the collar is turned up or down.

In order to secure the automatic adjustment of the parts and preserve the shape of the collar, while at the same time permitting its adjustment to one form or the other whenever desired, I insert between the parts E and D in addition to the ordinary lining—which may be used if desired—the pieces of material A, B and C cut and arranged as shown. The pieces are secured to the part E at its edges only, but are secured together and to the lining J of the part E. They are so arranged that the strip C, which is preferably made of haircloth or like material is on the fold of the turned-down collar, and the line of junction of the strip A which is of soft canvas or similar material and the interlining B of stiff material, is also coincident with this fold and covered by the strip C. The result of this arrangement is that when the collar is turned up the excess of width at the medial portion is taken up by the crease (see Fig. 2) and the part of the piece E between the crease and the top of the collar is straightened out by the action of the stiff interlining B. When the collar is again turned down the parts will assume their proper position and hold the shape of the collar indefinitely.

The part D may be provided with a lining as K, and interlining in the usual manner, if desired, and when the "military" collar is used it is unnecessary to provide it with means for extending or contracting it as it is of substantially the same proportions in both of its positions.

By the use of these improvements the advantages hereinbefore enumerated are attained, and the disadvantages of the ordinary collar when turned up avoided.

One of the particular advantages of the improvements is that they permit the collar, when turned up, to fit closely the neck of the wearer, thus affording protection against wet and cold without interfering with the movement of the wearer's head or causing other inconvenience.

Another advantage resides in the fact that the two collars maintain proper relations to each other and to the neck of the garment in all positions, and do not have the objectionable feature that a portion of one of the collars may become displaced. When the collar is turned up the inner collar automatically assumes its proper position, and when the collar is turned down, the military collar assumes its proper position beneath the turned-down collar and its edges will retain their fixed relation with respect thereto. The words "fixed relation" in the claims, therefore, refer to the standing collar and not to the turned-down collar, and mean that the said standing collar is so secured that its edges will not move from their position with respect to the turned-down collar either in the turned-up or turned down relation and will always assume that fixed position when the collar is turned one way or the other. This incidentally assists the turned-down collar to assume its proper position and to remain in that position, and obviates the necessity for direct connection or coincidence between the lower edges.

What I claim is:

1. In a device of the character described the combination of a coat or like garment, a piece of material secured along one edge to the neck of the coat and a second piece of material also secured to said neck whereby a duplex collar is formed, the opposite edges of the two pieces being secured together and one being of greater width than the other at its medial portion.

2. In a device of the character described the combination of a coat or like garment, a piece of material secured along one edge to the neck of the coat and a second piece of material also secured to said neck whereby a duplex collar is formed, the opposite edges of the two pieces being secured together and one being of greater width than the other at its medial portion and the said piece which is of greater width medially being of lesser width at its ends.

3. In a device of the character described the combination of a coat or like garment, a piece of material secured along one edge to the neck of the coat and a second piece also secured to the neck, the opposite edges of the two pieces being secured together and one being of greater width than the other at the middle of the collar, the ends of said pieces being disconnected from each other and a portion of the second piece near each end being disconnected from the coat, whereby a duplex collar is formed.

4. In a device of the character described the combination of a coat or like garment, a piece of material secured along one edge to the neck of the coat forming the upper and outer side of a turned down collar, a second piece of material also secured to the neck back of the first named piece the said pieces forming a duplex collar, means for securing the two pieces together beyond the neck of the coat, and the first being of greater width medially than the second whereby a plait may be formed in the first piece to take up the extra width thereof when the collar is turned up.

5. In a device of the character described, the combination of a coat or like garment, a piece of material secured along one edge to the neck of the coat and a second piece of material also secured to the neck whereby a duplex collar is formed, the opposite edges of the two pieces of material being secured together and one being of greater width than the other, a piece of material secured to the back of one piece at its medial portion along the edge which is secured to the neck of the coat and extending part way across the width of the same, a second strip of material or interlining of stiffer material than the first strip secured to the back of the said piece of material at its other edge, and covering a portion not covered by the first named strip.

6. In a device of the character described, the combination of a coat or like garment, a piece of material secured along one edge to the neck of the coat and a second piece of material also secured to the neck, the opposite edges of the two pieces of material being secured together and one being of greater width than the other, a substantially segmental piece of material secured to the back of the first piece at its medial portion along the edge which is secured to the neck of the coat and extending part way across the width of the same, a second strip of material or interlining of stiffer material than the first strip secured to the back of the said piece of material at its other edges and covering the portion not covered by the first named strip, the said two strips having their edges which are not secured to the back of the second piece adjacent to each other, and a third strip extending over the said edges but having its edges disconnected from the said piece of material.

7. In a device of the character described, the combination of a coat or like garment, a collar piece secured along one edge to the neck of the coat and a second collar piece also secured to the neck, the opposite edges of the two pieces of material being secured together and one being of greater width medially than the other and an interlining between the two pieces composed of a plurality of pieces made of materials of different degrees of flexibility, one of said interlining pieces extending part way across the width of the collar pieces, whereby a duplex collar is formed.

8. In a device of the character described, the combination of a coat or like garment, a collar piece secured along one edge to the neck of the coat and a second collar piece also secured to the neck of the coat, the opposite edges of the two pieces of material being secured together and one being of greater width than the other medially, and an interlining composed of a plurality of pieces of material of different degrees of flexibility secured between the said collar pieces, the said collar pieces being disconnected from each other between their edges at their medial parts whereby a duplex collar is formed.

9. In a device of the character described the combination of two strips of material adapted to be secured to the neck of a garment along one edge, and having their opposite edges secured together, an interlining of stiff material between the said strips extending from the edges which are secured together to a point near the opposite edges but disconnected therefrom, one of the said strips being of greater width than the other at its medial portion.

10. In a device of the character described the combination of two strips of material adapted to be secured to the neck of a garment along one edge, and having their opposite edges secured together, an interlining of stiff material between the said strips extending from the edges which are secured together to a point near the opposite edges, but disconnected therefrom, a second interlining piece of more flexible material secured to the neck of the garment at one edge and to the stiff interlining at the other edge, and a third interlining piece extending over the inner edges of the first and second pieces and secured thereto.

11. In a device of the character described the combination of two strips of material adapted to be secured to the neck of a garment along one edge, and having their opposite edges secured together, an interlining of stiff material between the said strips extending from the edges which are secured together to a point near the opposite edges but disconnected therefrom, a second interlining piece of more flexible material secured to the neck of the garment at one edge and to the stiff interlining at the other edge.

12. A duplex collar composed of two strips of material secured to the neck of a garment and secured together, one of said strips forming the outer side of a turned down collar and the other forming the outer side of a turned up collar and one of said strips being wider medially than the other strip, and means whereby the extra width of the wider strip is taken up when the collar is turned to the position where it is on the inside thereof.

13. A duplex collar comprising in its construction a turned down collar composed of a width or piece of material tapering in width from its medial part toward its ends attached to the neck of a garment, a standing or "military" collar secured back of the turned-down collar, the upper edge of the said standing collar being coincident with the lower outer edge of the turned-down collar and the lower edge of the said standing collar being coincident with the inner edge of the turned-down collar at the medial portion of the two collars and non-coincident therewith at the ends.

14. A duplex collar comprising in its construction a turned-down collar attached to the neck of a garment, a standing or "military" collar secured back of the turned down collar, the upper edge of the said standing collar being coincident with the lower outer edge of the turned-down collar and the lower edge of the said standing collar being coincident with the inner edge of the turned-down collar at the medial portion of the two collars but non-coincident therewith at the ends.

15. A duplex or two-fold collar for garments comprising a turned-down collar secured to the neck of a garment, a standing or military collar secured at the back of the turned-down collar with its upper and lower edges in fixed relation to the turned-down collar substantially throughout its length, the two collars being only partly coincident, the construction and arrangement being such that when the turned-down collar is in its normal position the standing collar is concealed by it, and when the standing collar is in its normal position the turned-down collar is concealed by it.

Witness my hand this 6th day of October, 1909.

MORRIS KOPPELMAN.

In the presence of—
S. G. O'Rourke,
S. J. Cox.